United States Patent [19]

Morishita

[11] 4,435,676
[45] Mar. 6, 1984

[54] REGULATOR FOR CONTROLLING OUTPUT FROM GENERATOR HAVING AMBIENT TEMPERATURE OVERRIDE

[75] Inventor: Mitsuharu Morishita, Himeji, Japan

[73] Assignee: Mitsubishi Denki Kabushiki Kaisha, Tokyo, Japan

[21] Appl. No.: 472,474

[22] Filed: Mar. 7, 1983

[30] Foreign Application Priority Data

Mar. 16, 1982 [JP] Japan .................................. 57-43582

[51] Int. Cl.³ ............................ H02J 7/14; H02P 9/30
[52] U.S. Cl. ......................................... 322/33; 320/35; 320/64; 322/28
[58] Field of Search ........................ 322/28, 33, 34, 99; 320/35, 64, 68

[56] References Cited

U.S. PATENT DOCUMENTS

| | | | |
|---|---|---|---|
| 3,522,482 | 8/1970 | Thompson | 322/33 X |
| 3,663,946 | 5/1972 | Iwaki | 322/33 X |
| 4,237,412 | 12/1980 | Rundlof | 322/33 X |
| 4,385,270 | 5/1983 | Balan et al. | 320/35 X |

Primary Examiner—R. J. Hickey
Attorney, Agent, or Firm—Wenderoth, Lind & Ponack

[57] ABSTRACT

The disclosed device for controlling an output from an AC generator to a predetermined magnitude comprises two transistors put in a Darlington configuration and connected across a rectified electric source due to the AC generator through a field coil of the AC generator, a control transistor connected to a base circuit for the two transistors, and a first Zener diode connected to a base of the control transistor. Two serially connected resistors form a voltage sensor connected across the rectified electric source through a common emitter transistor. The Zener diode is connected to the junction of the serially connected resistors, and the common emitter transistor include a base connected via a second Zener diode to the junction of a resistor and a thermally sensitive switch element serially connected to form a temperature sensor connected across the rectified electric source.

2 Claims, 1 Drawing Figure

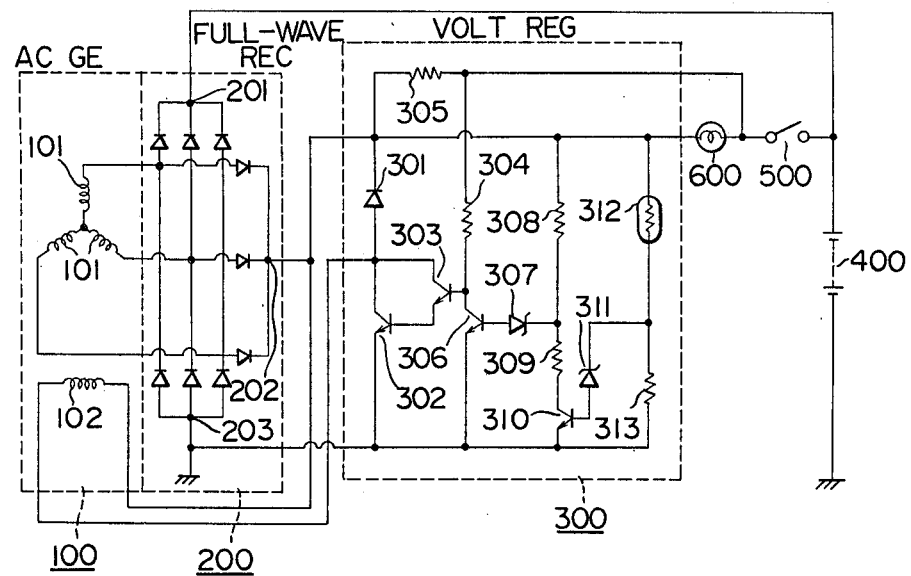

REGULATOR FOR CONTROLLING OUTPUT FROM GENERATOR HAVING AMBIENT TEMPERATURE OVERRIDE

BACKGROUND OF THE INVENTION

This invention relates to a control device for controlling an output from a generator, and more particularly to such a device for controlling a rectified output from an AC generator in accordance with a temperature.

For example, motor vehicles comprise the internal combustion engine, the AC generator driven by the internal combustion engine, and the battery charged with a rectified output from the AC generator. In order to control the rectified output to a predetermined magnitude, a voltage regulator is disposed within the AC generator or on an enclosure thereof and includes a pair of output transistors put in a Darlington configuration and connected at one end to one portion of the rectified output through a field coil disposed on the AC generator and at the other end to ground, a control transistor connected to a base circuit of the output transistors, and a Zener diode connected to the control transistor. The Zener diode has been previously connected to both a first junction of a pair of resistors (which form a first voltage dividing circuit connected across the one portion of the rectified output) and a second junction of a resistor and a thermally sensitive switch element (which form a second voltage dividing circuit connected across the one portion of the rectified output) through respective diodes forming an "OR" circuit. The thermally sensitive switch element is connected to ground and responsive to a predetermined temperature to abruptly increase in resistance in a positive direction.

When the rectified output increases to raise a potential at the first junction to a predetermined magnitude, the Zener diode is turned on to turn the output transistors off through the turn-on of the control transistor resulting in the interruption of a field current flowing through the field coil. Thus the rectified output from the AC generator decreases to reduce the potential at the first junction to be less than the predetermined magnitude. At that time, the Zener diode is turned off to turn the output transistors on. The process as described above is repeated to maintain the rectified output from the AC generator to the predetermined magnitude.

Also the ambient temperature for the AC generator may abruptly increase for some reasons. With the AC generator operated under high electrical loading, the ambient temperature tends to reach a high magnitude at and above which the AC generator will be thermally broken or extremely decrease in lifetime with heat generated by the same itself. This is attended with a corresponding increase in temperature of the thermally sensitive switch element. Thus the thermally sensitive switch element exceeds the predetermined temperature set therefor to have a magnitude of resistance abruptly increased in the positive direction resulting in an increase in potential at the second junction. This causes the Zener diode to be turned on through the diode connected to that junction regardless of the potential at the first junction. Therefore no field current flows through the field coil as described above. Thus the AC generator does not generate the output and hence heat. Accordingly the ambient temperature abruptly decrease until the potential at the second junction decreases due to the temperature of the thermally sensitive switch element is less than the predetermined one and becomes independent of the operation. Thereafter the Zener diode and the control transistor continue to be operated under the control of the potential at the first junction.

In the conventional voltage regulator as described above, the potential at the first junction is connected to that at the second junction, through the "OR" circuit. Thus a reference voltage set by the Zener diode has a forward voltage drop across the diode in the "OR" circuit serially inserted thereinto. Accordingly the conventional voltage regulator not requiring a temperature gradient should avoid the influence of a negative temperature coefficient of the forward voltage drop on a temperature rise. The negative temperature coefficient is of about 2 mV/C°.

As a result, it has been previously required to use an additional diode for compensating for a voltage due to the negative temperature coefficient of the forward voltage drop across the diode in the "OR" circuit.

Accordingly, it is an object of the present invention to provide a new and improved generator's output control device decreased in the influence of a temperature.

SUMMARY OF THE INVENTION

The present invention provides a control device for controlling an output from an generator, comprising an AC generator, including a field coil, a full-wave rectifier connected to the AC generator and including a first, a second and a third output terminal, a field current control circuit for controlling a field current flowing through the field coil to maintain an output from the AC generator at a predetermined magnitude, a voltage sensing circuit connected between the second and third output terminals of the full-wave rectifier to sense a rectified output across the second and third output terminals to apply a first control signal to the field current control circuit in accordance with sensed rectified output, and a temperature sensing circuit connected between the second and third output terminals of the full-wave rectifier to sense an ambient temperature for the AC generator, the temperature sensing circuit being responsive to the ambient temperature in excess of a predetermined magnitude to apply a second control signal for interrupting the field current to the field current control circuit in parallel circuit relationship with the voltage sensing circuit, the voltage sensing circuit including an input terminal connected only to the voltage sensing circuit, the temperature sensing circuit being connected to the voltage sensing circuit so that the temperature sensing circuit is responsive to the ambient temperature in excess of the predetermined magnitude set therefor to cause the voltage sensing circuit to apply the second control signal to the field current control circuit.

In a preferred embodiment of the present invention, the field current control circuit includes a pair of output transistors put in a Darlington configuration connected across to the second and third output terminals of the full-wave rectifier through the field coil, a control transistor connected to a base circuit for the pair of output transistors, and a first Zener diode connected to a base electrode of the control transistor. The voltage sensing circuit is formed of a pair of serially connected resistors and connected at one end to the second output terminal of the full-wave rectifier, and at the other end to the third output terminal thereof through a common emitter transistor. The temperature sensing circuit is formed of a resistor connected to the second output terminal of the full-wave rectifier and a thermally sensitive switch element serially connected at one end to the last-mentioned resistor and at the other end to the third output terminal thereof, the thermally sensitive switch element being responsive to a predetermined temperature to abruptly increase in resistance in a positive direction. The first Zener diode is directly connected to a junction of the serially connected resistors of the voltage sensing circuit and the common emitter transistor includes a base electrode connected to a second Zener diode subsequently connected to a junction of the resistor and the thermally sensitive switch element of the temperature sensing circuit.

BRIEF DESCRIPTION OF THE DRAWING

The present invention will become more readily apparent from the following detailed description taken in conjunction with the accompanying drawing in which a single FIGURE is a circuit diagram of one embodiment according to the generator's output control device of the present invention.

DESCRIPTION OF THE PREFERRED EMBODIMENT

Referring now to the drawing, there is illustrated one embodiment according to the generator's output control device of the present invention. The arrangement illustrated comprises an AC generator generally designated by the reference numeral 100 including a three-phase armature coil 101 put in a star connection and a field coil 102, and a three-phase full-wave rectifier generally designated by the reference numeral 200 for full-wave rectifying an AC output from the AC generator 100. The AC generator 100 is equipped on a motor vehicle (not shown) and driven by an internal combustion engine (not shown) also equipped on that motor vehicle, and the three-phase full-wave rectifier 200 includes a first rectified output terminal 201, a second rectified output terminal 202 and a third rectified output terminal 203 connected to ground. Then a semiconductor type voltage regulator generally designated by the reference numeral 300 is connected across the second and third output terminals 202 and 203 respectively of the three-phase full-wave rectifier 200 and a battery 400 is connected across the first and third rectified output terminals 201 and 202 respectively with the negative side of the battery 400 connected to ground. Further, a key switch 500 normally put at its open position and a charge indicator lamp 600 are connected in series circuit relationship across the positive side of the battery 400 and the second rectified output terminal 202 of the three-phase full-wave rectifier 200.

The voltage regular 300 is disposed within the AC generator 100 or on an envelope (not shown) therefor to control an output voltage from the AC generator 100 by controlling a current through the field coil 102. The voltage regulator 300 includes a surge absorbing diode 301 and a pair of n-p-n transistors 202 and 303 connected into a Darlington configuration in which an emitter electrode of the transistor 302 connected to the third rectified output terminal 203 or ground and collector electrodes of the transistors 302 and 303 are connected together to the second rectified output terminal 202 through the diode 301 and also connected to the same terminal through the field coil 102. The transistor 303 includes a base electrode connected to the second rectified output terminal 202 of the full-wave rectifier 200 through a base resistor 304 forming a base circuit for the transistors 302 and 303 and an initially exciting resistor 305 which is also connected to the junction of the key switch 500 and the charge indicator lamp 600. The transistors 302 and 303 form output transistors for applying a field or exciting current to the field coil 102 of the AC generator 100 and interrupting that curent.

The base electrode of the transistor 303 is also connected to a collector electrode of an n-p-n control transistor 306 including an emitter electrode connected to that of the transistor 302, a collector electrode connected to the base electrode of the transistor 303 and a base electrode connected to an anode electrode of a first Zener diode 307 for setting a reference voltage. The control transistor 306 controls the ON-OFF operation of the output transistors 302 and 303. The pair of output transistors 302 and 303, the control transistor 306 and the Zener diode 307 form a field current control circuit.

In a conventional voltage regulator comprising the components as described above, a pair of resistors have been serially interconnected across the second and third rectified output terminals 202 and 203 of the full-wave rectifier 200 to form a first voltage dividing circuit forming a voltage sensing circuit and also a thermally sensitive switch element has been connected to the second rectified output terminal 202 to form a second voltage dividing circuit or a temperature sensing circuit with a resistor connected to both the thermally sensitive switch element and the third rectified output terminal 203 or ground. The thermally sensitive switch element is responsive to a predetermined temperature to abruptly increase in resistance in a positive direction. Then the Zener diode has been connected to both a first junction of the serially connected resistors of the voltage sensing circuit and a second junction of the thermally sensitive switch element and the mating resistor of the temperature sensing circuit through respective diodes forming an "OR" circuit.

Upon starting the internal combustion engine (not shown), the key switch 500 is closed to cause the battery 500 to supply a base current to the transistors 302 and 303 through the now closed key switch 500, the charge indicator lamp 600 and the base resistor 304 to turn the transistors 302 and 303 on. Thus a current from the battery 400 flows through a current path including the now closed key switch 500, a parallel circuit of the charge indicator lamp 600 and the initially exciting resistor 305, the field coil 102, and the transistors 302 and 303 now turned on to generate a field magnetomotive force from the field coil 102. At that time the junctions on the two voltage dividing networks are at low potentials and therefore the Zener diode 307 and the control transistor 305 are left in their OFF state or nonconducting. Also the charge indicator lamp 600 is energized to indicate that the battery 400 is not charging.

Under these circumstances, the internal combustion engine is started to drive the AC generator. Thus the AC generator 100 induces an AC output across the armature coil 101 dependent upon a rotational speed thereof. That AC output is full-wave rectified by the full-wave rectifier 200 which, in turn, produces positive voltages at the first and second rectified output terminals 201 and 202 and a negative voltage at the third rectified output terminal 203.

When the positive voltage at the second terminal 202 exceeds a predetermined magnitude, a first junction of the serially connected resistors of the voltage sensing circuit has a electric potential in excess of a predetermined magnitude to conduct the Zener diode 307. The conduction of the Zener diode 307 causes the control transistor 300 to be turned on thereby to turn the transistors 302 and 303 off resulting in a decrease in field current flowing through the field coil 102. Thus the output voltage induced across the armature coil 101 of the AC generator 100 decreases until it becomes less than the predetermined magnitude as described above. At that time the Zener diode 307 and therefore the control transistor 306 is turned off to turn the transistors 302 and 303 on. Thus the field current is again increased to increase the output voltage from the AC generator 100.

The process as described above is repeated to control the output voltage from the AC generator 100 to the predetermined magnitude.

On the other hand, the second rectified output terminal 202 increases in potential until it has its voltage substantially equal to a voltage across the battery 400. At that time the charge indicator lamp 600 is deenergized to indicate that the battery 400 is in its charged state.

The ambient temperature for the AC generator 100 may abruptly rise for some reason, for example, by causing the internal combustion engine to abruptly change to the idling mode of operation after it has been operated under high loading. If, at that time the AC generator 100 has a high electrical load (not shown) then the ambient temperature tends to increase to a high magnitude at and above which the AC generator will be thermally broken or extremely decreased in lifetime with heat generated by the AC generator itself. This is attended with a relative increase in temperature of the voltage regulator 300 which is disposed within the AC generator 100 or mounted to the envelope for the AC generator 100 as described above. Thus the thermally sensitive switch element exceeds the predetermined temperature to have its magnitude of resistance abruptly increased in the positive direction resulting in an increase in potential at a second junction of the thermally sensitive switch element and the mating resistor of the temperature sensing circuit. This causes the Zener diode 307 to be turned on through the diode connected to that junction independently of the potential at the first junction in the voltage sensing circuit. Therefore the control transistor 306 is turned on to turn the transistors 302 and 303 off resulting in the interruption of the field current. Thus the AC generator 100 suspends to produce an electric power and therefore stops the self-generation of heat due to a flow of output current therethrough. (That self-generation of heat forms the greater part of the self-generation of heat by the AC generator.) Thus the raised temperature of the AC generator 100 abruptly decreases to be less than the predetermined temperature set for the thermally sensitive switch element. At that time that element again abruptly decreases in resistance to decrease the potential at the second junction of the same and the mating resistor until that potential is independent of the operation. Thereafter the Zener diode 307 and the control transistor 306 continue to be operated under the control of the potential at the first junction on the voltage sensing circuit.

In the conventional voltage regulator as described above, the first junction on the voltage sensing circuit is connected to the second junction on the temperature sensing circuit through the "OR" circuit formed of the pair of diodes. Thus the conventional voltage regulator had the objections as described above.

The present invention contemplates to provide a generator's output control device reduced in influence of a temperature by forming a voltage sensing circuit and a temperature sensing circuit so as not to serially connect pair of diodes forming an "OR" circuit to the Zener diode for setting the reference voltage.

According to the present invention, the Zener diode 307 is directly connected to a first junction of a pair of serially connected resistors 308 and 309 forming a voltage sensing circuit which is, in turn, connected across the second rectified output terminal 202 and the third rectified out terminal 203 through a common emitter n-p-n transistor 310 serving as a voltage dropping transistor as shown in the drawing. That is, the resistor 309 is connected to a collector electrode of the n-p-n transistor 310 including an emitter electrode connected to ground. The transistor 310 includes a base electrode connected to an anode electrode of a second Zener diode 311 which is, in turn, connected at the cathode electrode to a second junction of a thermally sensitive switch element 312 and a resistor 313 connected serially thereto to form a temperature sensing circuit which is, in turn, connected across the second and third rectified output terminals 202 and 203 of the full-wave rectifier 200. It is noted that the thermally sensitive switch element 312 previously located on the ground side is connected to the second rectified output terminal 202 of the full-wave rectifier 200 with omitting the pair of diodes for connecting the first Zener diode 307 to the junctions on voltage and temperature sensing circuits.

Assuming that the arrangement illustrated is at a temperature less than the predetermined temperature set for the thermally sensitive switch element 312, the second junction of that element and the mating resistor 313 of the temperature sensing circuit is always at a high potential to maintain the second Zener diode 311 and the transistor in the conducting state. Thus the resistors 308 and 309 of the voltage sensing circuit are connected to ground through the now conducting transistor 310. Under these circumstances, the voltage sensing circuit senses the output voltage from the AC generator 100 with the result that the output voltage from the AC generator 100 is controlled by the first Zener diode 307, and the transistors 306, 303 and 302 as described above in accordance with the potential at the first junction.

It is now assumed that the ambient temperature for the AC generator 100 abruptly increases for some reasons. Under the assumed conditions, the thermally sensitive switch element 312 exceeds the predetermined temperature set therefor to abruptly increase in resistance. Thus the second junction of the thermally sensitive switch element 312 and the resistor 313 decrease in potential until the second Zener diode 311 and the transistor 310 are turned off. Thus the serially connected resistors 308 and 309 is disconnected from ground resulting in an increase in potential at the first junction thereof of the resistors 308 and 309. As a result, the first Zener diode 307 and the transistor 306 are turned on to turn the transistors 303 and 302 off. This causes the interruption of the field current flowing through the field coil 102 to suspend the AC generator 100 to generate the electric power. Therefore the AC generator 100 suspends to generate heat by itself due to the output current flowing therethrough resulting in an abrupt decrease in raised temperature and therefore in temperature of the thermally sensitive switch element 312.

When the temperature of the thermally sensitive switch element 312 decreases to be less than the predetermined magnitude, the second junction of the switch element 312 and the mating resistor 313 increases in potential to turn the second Zener diode 311 and the transistor 310 on. Therefore the serially connected resistors 308 and 309 are again connected to ground through the now conducting transistor 310 to initiate the first Zener diode 307 and the transistor 306 to be operated under the control of the potential at the first junction of the resistors 308 and 309 forming the voltage sensing circuit. Thus the output voltage from the AC generator 100 is controlled as described above.

From the foregoing it is seen that, according to the present invention, a voltage dropping transistor is serially connected to a resistor on the reference voltage side forming a voltage sensing circuit for sensing an output voltage from an AC generator and a Zener diode is serially inserted into a base circuit of that transistor and also connected to the junction of a thermally sensitive switch element and a resistor serially interconnected across a DC electric source. Thus the resulting temperature sensing circuit can control the operation of the voltage sensing circuit so as to be connected to or disconnected from ground. In addition, it is not required to serially connect a reference voltage developed across a first Zener diode to a forward voltage drop across each of a pair of diodes forming an "OR" gate which has been previously necessary. Accordingly the present invention can provide an excessive temperature limited type charging generator having no temperature gradient.

While the present invention has been illustrated and described in conjunction with a single preferred embodiment thereof it is to be understood that numerous changes and modifications may be resorted to without departing from the spirit and scope of the present invention.

What is claimed is:

1. A control device for controlling an output from an AC generator, comprising an AC generator including a field coil, a full-wave rectifier connected to said AC generator and including a first, a second, and a third output terminal, a field current control circuit for controlling a field current through said field coil of said AC generator to maintain an output from said AC generator to a predetermined magnitude, a voltage sensing circuit connected between said second and third output terminals of said full-wave rectifier to sense rectified output between said second and third output terminals to apply a first control signal to said field current control circuit in accordance with the sensed rectified output, and a temperature sensing circuit connected between said second and third output terminals of said full-wave rectifier to sense an ambient temperature for said AC generator, said temperature sensing circuit being responsive to the ambient temperature in excess of a predetermined magnitude to apply a second control signal for interupting said field current to said field current control circuit in parallel circuit relationship with said voltage sensing circuit, said field current control circuit including an input terminal connected only to said voltage sensing circuit, said temperature sensing circuit being connected to said voltage sensing circuit so that said temperature sensing circuit is responsive to the ambient temperature in excess of said predetermined magnitude set therefor to cause said voltage sensing circuit to apply said second control signal to said field current control circuit.

2. A control device for controlling an output from an AC generator as claimed in claim 1 wherein said field current control circuit includes a pair of output transistors put in a Darlington configuration connected across to said second and third output terminals of said full-wave rectifier through said field coil, a control transistor connected to a base circuit for said pair of output transistors, and a first Zener diode connected to a base electrode of said control transistor, said voltage sensing circuit is formed of a pair of serially connected resistors and connected at one end to said second output terminal of said full-wave rectifier, and at the other end to said third output terminal thereof through a common emitter transistor, and said temperature sensing circuit is formed of a resistor connected to said second output terminal of said full-wave rectifier and a thermally sensitive switch element serially connected at one end to the last-mentioned resistor and at the other end to said third output terminal thereof, said thermally sensitive switch element being responsive to a predetermined temperature to abruptly increase in resistance in a positive direction and wherein said first Zener diode is directly connected to a junction of said serially connected resistors of said voltage sensing circuit and said common emitter transistor includes a base electrode connected to a second Zener diode subsequently connected to a junction of said resistor and said thermally sensitive switch element of said temperature sensing circuit.

* * * * *